UNITED STATES PATENT OFFICE.

ERIK C. CLEMMENSEN AND ARNOLD H. C. HEITMANN, OF DETROIT, MICHIGAN, ASSIGNORS TO PARKE, DAVIS & COMPANY, OF DETROIT, MICHIGAN, A CORPORATION.

ALKYL-OXY-ACETYL UREA AND PROCESS OF MAKING SAME.

No. 797,792.   Specification of Letters Patent.   Patented Aug. 22, 1905.

Application filed April 1, 1905. Serial No. 253,255.

*To all whom it may concern:*

Be it known that we, ERIK C. CLEMMENSEN, a subject of the King of Denmark, and ARNOLD H. C. HEITMANN, a citizen of the United States, both residing at Detroit, Wayne county, Michigan, have invented a certain new and useful Alkyl-Oxy-Acetyl Urea and Process of Making Same, of which the following is a specification.

The invention relates to a new class of compounds which may be designated as "ureids of alkyl-oxy-acetic acids;" and the invention consists, first, in the new chemical compound, and, second, in the process of manufacturing the same.

The new body is a condensation product of an alkyl-oxy-acetic acid and a urea and may be formed by the treating of the said substances with a condensing agent or by treating an ester of the alkyl-oxy-acetic acid and the urea with the condensing agent. It may also be formed by other methods, as hereinafter set forth.

In the formation of various specific compounds included in the class different substances may be employed, and we will therefore describe one specific case in which the di-ethyl-oxy-acetic acid is combined with urea to form the di-ethyl-oxy-acetyl urea.

The union of the ingredients may be produced by several methods; but it is preferably accomplished in solution and preferably by the employment of alcohol as a solvent. The ingredients are dissolved in the alcohol in molecular proportions and are then treated with a condensing agent, preferably an alkali-alcoholate, after which the mixture is heated on a steam-bath, preferably for several hours. During this period the reaction which begins immediately is completed and may be expressed as follows:

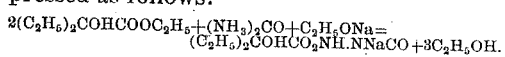

In the above reaction two molecules of the di-ethyl-oxy-acetic ester combined with one molecule of the urea and one molecule of the condensing agent form a sodium salt of the desired product. The free substance may then be obtained by acidifying the solution with any suitable acid, such as hydrochloric, to produce the following reaction:

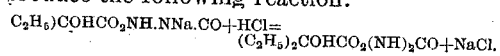

The result of the complete reaction is therefore the formation of one molecule of di-ethyl-oxy-acetyl urea and one molecule of a sodium salt of the acid used.

In the reaction above given the condensing agent—viz., sodium alcoholate—enters into the desired product; but where other condensing agents are employed—such, for instance, as fuming sulfuric acid—the product may be formed without a chemical change of the condensing agent. To obtain the pure product, the alcohol is removed by distillation, after which the sodium salt and free acid are removed by washing with water. The yield is nearly theoretical.

In place of the specific ingredients above described any alkyl-oxy-acetic acid or its ester and any of the ureas—such as urea, acetyl-urea, alkyl-ureas, thio-urea, alkyl-thio-urea, urethanes and guanidin—may be combined by the use of any suitable condensing agent—such as freshly-burned alkali earth oxids, metallic alkalies, fuming sulfuric acid, phosphorous chlorids, thionyl chlorid, sulfuryll chlorid, sulfonic-acid chlorids, and other organic-acid chlorids—as, for instance, acetyl chlorid, carbonyl chlorid, organic and inorganic acid anhydrids.

As a modification of the process above described, the compound may be formed by mixing a urea with an alkyl-oxy-acetyl chlorid, whereupon reaction immediately takes place as follows:

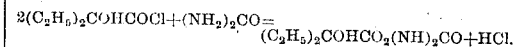

The result of this reaction is the immediate formation of the free product.

In a further modification of the process the compound may be formed by mixing one molecule of guanidin with two molecules of alkyl-oxy-acetic ester and one molecule of sodium alcoholate, as a result of which one molecule of alkyl-oxy-acetyl guanidin is obtained. To obtain the free alkyl-oxy-acetyl urea, this product may be oxidized by any suitable oxidizing agent—as, for instance, nitric acid in the presence of sulfuric, as indicated by the following reaction:

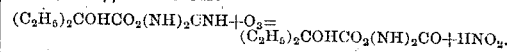

The product obtained may be broadly designated a "ureid of alkyl-oxy-acetic acid" and is characterized by the following properties: It is a heavy, oily, colorless liquid, soluble in water, having a slight ethereal odor and acid properties, forming with alkali and alkali earths salts which are crystalline and readily soluble in water and alcohol. The pure substance is further characterized by being soluble in organic solvents, such as alcohol, ether, chloroform, acetone, benzol, and glycerin. It may be distilled under reduced pressure. In its physiological effects it is hypnotic, possessing this action both as the original compound and the salts derived therefrom.

The specific product of the process as above given—viz., the di-ethyl-oxy-acetyl urea—has, in addition to the physical characteristics above given, the following: It has a specific gravity of 1.1107 and boils at thirty-six millimeters pressure at a temperature of 186° centigrade, and is soluble in water in the proportion of one part of the substance to twenty parts of distilled water.

The action of the substance when given in doses of about two grams causes a natural physiological sleep without producing any apparent disagreeable after effects.

In the use of the term "alkyl-oxy acetic acid" in the claims we mean to include either the acid or its ester.

What we claim as our invention is—

1. The herein-described substance which is a condensation product of alkyl-oxy-acetic acid and a urea and is characterized by its hypnotic action and the following physical properties: In its pure form, it is a colorless liquid, heavier than water, having a slight ethereal odor and an acid taste, is soluble in organic solvents, such as alcohol, ether, chloroform, acetone, benzol, glycerin, may be distilled under reduced pressure and combines with basic substances to produce salts which also have hypnotic action.

2. The herein-described substance, which is a condensation product of di-ethyl-oxy-acetic acid and urea and is characterized by its hypnotic action and the following physical properties; it is a colorless oily liquid, heavier than water, having a slight ethereal odor and an acid taste, a specific gravity of 1.1107 and boils at thirty-six millimeters pressure at a temperature of 186° centigrade; it is soluble in water in proportion of about one part of substance to twenty parts of distilled water, readily soluble in water containing alkali in solution, forming soluble crystalline salts; it is very soluble in organic solvents, such as alcohol, ether, chloroform, acetone, benzol, glycerin, and may be represented by the following formula:

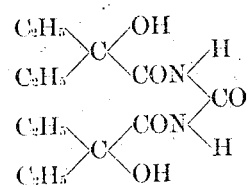

3. The herein-described process of obtaining alkyl-oxy-acetyl ureas, which consists in treating a mixture of alkyl-oxy-acetic acid and a urea with a condensing agent.

4. The herein-described process of obtaining alkyl-oxy-acetyl ureas, which consists in condensing an alkyl-oxy-acetic ester and a urea with an alkali-alcoholate.

5. The herein-described process of forming di-ethyl-oxy-acetyl urea, which consists in treating di-ethyl-oxy-acetic ester and a urea in alcoholic solution with an alkali-alcoholate as a condensing agent, in heating the mixture to facilitate reaction in then acidifying the solution and distilling off the alcohol, separating the oily product from the solution, washing with water and drying.

In witness whereof we have hereunto set our hands this 30th day of March, 1905.

ERIK C. CLEMMENSEN.
ARNOLD H. C. HEITMANN.

Witnesses:
AMELIA WILLIAMS,
JAS. P. BARRY.